(12) United States Patent
Page

(10) Patent No.: US 11,738,851 B2
(45) Date of Patent: Aug. 29, 2023

(54) SYSTEMS AND METHODS FOR MODULAR AIRCRAFT

(71) Applicant: Blended Wing Aircraft, Inc., Orange, CA (US)

(72) Inventor: Mark Allan Page, Orange, CA (US)

(73) Assignee: Blended Wing Aircraft, Inc., Orange, CA (US)

( * ) Notice: Subject to any disclaimer, the term of this patent is extended or adjusted under 35 U.S.C. 154(b) by 0 days.

(21) Appl. No.: 17/478,406

(22) Filed: Sep. 17, 2021

(65) Prior Publication Data

US 2023/0092771 A1 Mar. 23, 2023

(51) Int. Cl.
| | |
|---|---|
| B64C 1/06 | (2006.01) |
| B64C 39/10 | (2006.01) |
| B64C 9/00 | (2006.01) |
| B64F 5/10 | (2017.01) |
| B64C 39/00 | (2023.01) |
| B64C 7/02 | (2006.01) |

(52) U.S. Cl.
CPC ............... *B64C 1/069* (2013.01); *B64C 7/02* (2013.01); *B64C 9/00* (2013.01); *B64C 39/00* (2013.01); *B64C 39/10* (2013.01); *B64F 5/10* (2017.01); *B64C 2039/105* (2013.01); *B64C 2211/00* (2013.01)

(58) Field of Classification Search
CPC ................................................. B64C 2211/00
See application file for complete search history.

(56) References Cited

U.S. PATENT DOCUMENTS

| | | | |
|---|---|---|---|
| 2,439,423 A | 4/1948 | Fowler | |
| 2,463,346 A | 3/1949 | Akerman | |
| 4,736,910 A | 4/1988 | O—Quinn et al. | |
| 5,082,204 A * | 1/1992 | Croston | B64C 39/10 244/126 |
| 5,909,858 A * | 6/1999 | Hawley | B64C 39/10 244/36 |

(Continued)

FOREIGN PATENT DOCUMENTS

| | | |
|---|---|---|
| DE | 102006034862 A1 | 1/2008 |
| DE | 19934210 B4 | 1/2018 |

(Continued)

OTHER PUBLICATIONS

Denis Dilba, Modular aircraft: Flexibility to save costs, Feb. 28, 2019.

(Continued)

*Primary Examiner* — Philip J Bonzell
*Assistant Examiner* — Michael B. Kreiner
(74) *Attorney, Agent, or Firm* — Caldwell Intellectual Property Law

(57) ABSTRACT

A system for modular aircraft includes at least a common component, wherein the at least a common component includes at least a flight component. The system includes at least a modular component, wherein the at least modular component includes at least a fuselage component and a collar component. The system includes at least an interface component, wherein the at least an interface component is configured to connect the at least a common component at a first end to the at least a modular component at a second end.

19 Claims, 7 Drawing Sheets

(56) References Cited

U.S. PATENT DOCUMENTS

| | | | |
|---|---|---|---|
| 6,065,720 A * | 5/2000 | Ash | B64C 1/00 244/118.2 |
| 6,129,308 A * | 10/2000 | Nastasi | B64C 3/48 244/120 |
| 6,497,388 B1 | 12/2002 | Friend et al. | |
| 6,568,632 B2 * | 5/2003 | Page | B64C 1/0009 244/36 |
| 6,708,924 B2 * | 3/2004 | Page | B64C 39/10 244/36 |
| 6,926,235 B2 * | 8/2005 | Ouellette | B64C 1/00 244/119 |
| 7,093,798 B2 * | 8/2006 | Whelan | B64C 1/0009 244/120 |
| 7,344,110 B2 | 3/2008 | Giannakopoulos | |
| 8,191,820 B1 * | 6/2012 | Westra | B64C 39/10 244/36 |
| 8,292,220 B1 * | 10/2012 | Westra | B64C 39/12 244/118.1 |
| 8,366,050 B2 * | 2/2013 | Odle | B64C 1/1415 244/137.1 |
| 8,398,021 B2 * | 3/2013 | Koch | B64C 1/10 244/119 |
| 8,967,526 B2 * | 3/2015 | Karem | B64C 1/00 244/36 |
| 9,090,328 B2 * | 7/2015 | Goehlich | B64C 1/069 |
| 9,193,460 B2 | 11/2015 | Laudrain | |
| 9,221,532 B2 * | 12/2015 | Karem | B64C 1/061 |
| 9,505,484 B1 * | 11/2016 | Al-Sabah | B64C 13/20 |
| 10,167,081 B2 * | 1/2019 | Gallant | B64C 1/1423 |
| 10,259,560 B2 | 4/2019 | Ivans et al. | |
| 10,946,962 B2 * | 3/2021 | Banerjee | B64C 3/14 |
| 10,988,232 B2 * | 4/2021 | Crawford | B64D 33/00 |
| 2002/0145075 A1 * | 10/2002 | Page | B64C 1/0009 244/36 |
| 2005/0178912 A1 * | 8/2005 | Whelan | B64C 1/10 244/120 |
| 2012/0091257 A1 * | 4/2012 | Wolff | B64C 29/0033 244/12.4 |
| 2013/0264428 A1 | 10/2013 | Rouyre | |
| 2014/0159949 A1 * | 6/2014 | Mialhe | H01Q 21/20 342/26 B |
| 2019/0276129 A1 | 9/2019 | Morgan | |
| 2019/0291626 A1 | 9/2019 | Duffy et al. | |

FOREIGN PATENT DOCUMENTS

| | | |
|---|---|---|
| EP | 2799335 A1 | 11/2014 |
| FR | 3048226 A1 | 9/2017 |
| FR | 3070367 A1 | 3/2019 |
| GB | 1143781 A | 2/1969 |
| WO | 2004078588 A1 | 9/2004 |

OTHER PUBLICATIONS

Skyfire77, Flightline: 137—Fairchild XC-120 Packplane, Aug. 18, 2021.

* cited by examiner

SYSTEMS AND METHODS FOR MODULAR AIRCRAFT

FIELD OF THE INVENTION

The present invention generally relates to the field of aircraft design. In particular, the present invention is directed to systems and methods for modular aircraft.

BACKGROUND

The BWB aircraft is a hybrid shape that resembles a flying wing, but also incorporates features from conventional transport aircraft. This combination offers several advantages over conventional tube- and wing airframes. The BWB airframe merges efficient high-lift wings with a wide airfoil-shaped body, allowing the entire aircraft to generate lift and minimize drag. This shape helps to increase fuel economy and creates larger payload (cargo or passenger) areas in the center body portion of the aircraft.

The BWB shape allows unique interior designs. Cargo can be loaded or passengers can board from the front or rear of the aircraft. The cargo or passenger area is distributed across the wide fuselage, providing a large usable volume.

SUMMARY OF THE DISCLOSURE

In an aspect, a system for modular aircraft includes at least a common component, wherein the at least a common component includes at least a flight component, a first modular component, wherein the first modular component has a first width and includes a first fuselage component and a first collar component, a second modular component, wherein the second modular component has a second width and includes a second fuselage component and a second collar component, at least an interface component, wherein the at least an interface component includes a first end configured to connect to the at least a common component, and a second end configured to connect to the at least a modular component, wherein connection of the at least a common component, the first modular component and the at least an interface component forms a first blended wing body having a first wingspan that is a function of the first width and connection of the at least a common component, the second modular component and the at least an interface component forms a second blended wing body having a second wingspan that is a function of the second width.

In another aspect a method of manufacturing a modular aircraft includes receiving at least a common component, wherein the at least a common component includes at least a flight component, receiving a first modular component, wherein the first modular component has a first width and includes a first fuselage component and a first collar component, receiving a second modular component, wherein the second modular component has a second width and includes a second fuselage component and a second collar component, receiving at least an interface component, the at least an interface component includes a first end and a second end, connecting the at least a common component at the first end of the interface component, and selectably connecting one of the first modular component and the second modular component at the second end of the interface component, wherein connection of the at least a common component, the first modular component and the at least an interface component forms a first blended wing body having a first wingspan that is a function of the first width and connection of the at least a common component, the second modular component and the at least an interface component forms a second blended wing body having a second wingspan that is a function of the second width.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1A:
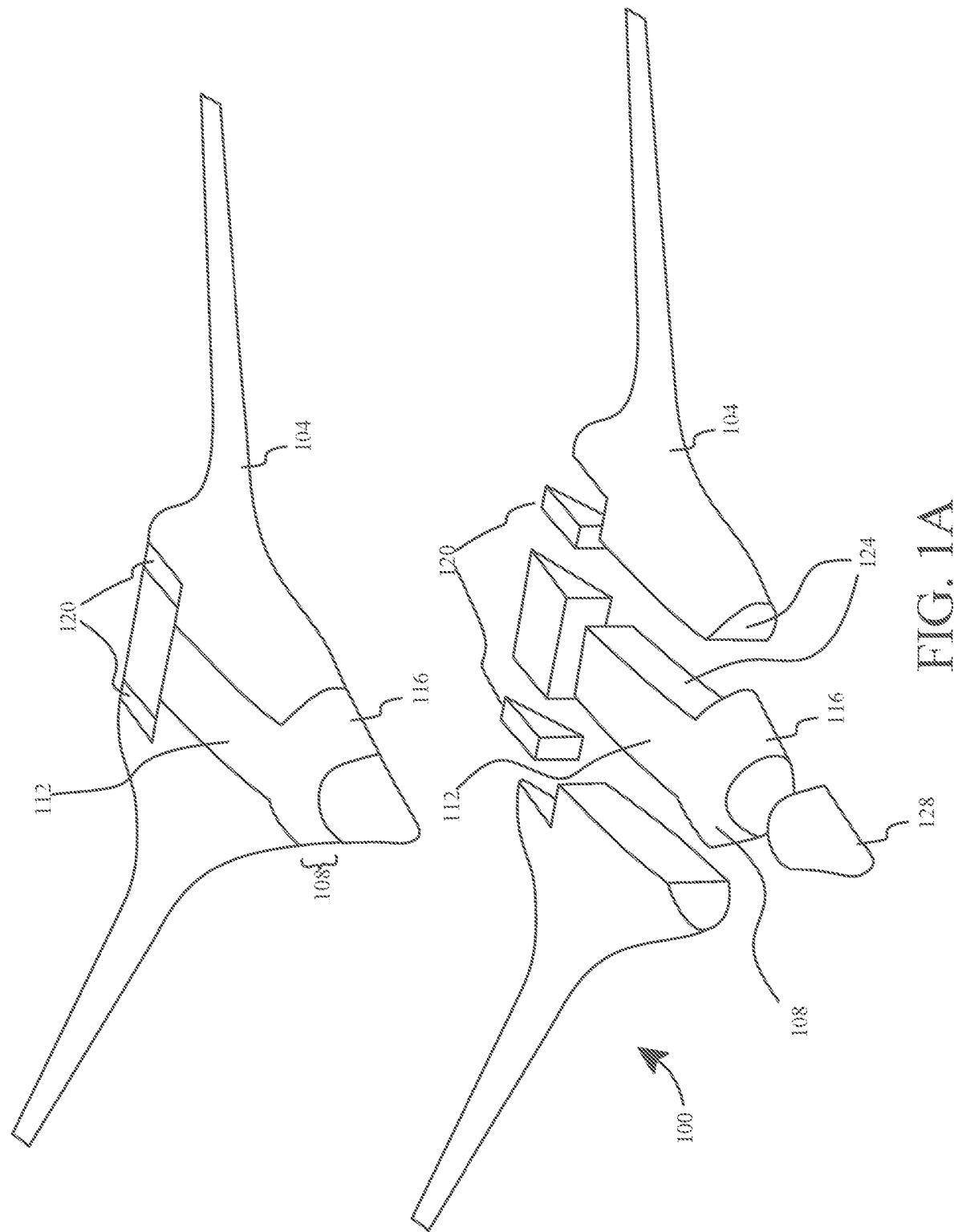
FIG. 1A is an illustration of an exemplary embodiment of a modular aircraft shown in isometric and exploded views.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to embodiments oriented as shown for exemplary purposes in FIG. 4. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply embodiments of the inventive concepts defined in the appended claims. Hence, specific dimensions and other physical characteris- Examples of the present disclosure related generally to aircraft, and specifically modular aircraft that enables the aircraft to be designed with commonality of parts. To simplify and clarify explanation, the disclosure is described herein as a system and method for use with a blended wing aircraft. One skilled in the art will recognize, however, that the disclosure is not so limited. While the system is useful in conjunction with blended wing aircraft due to some unique packaging constraints, it should be understood that the system can just as easily be used for conventional tube and wing, delta wing, and other aircraft configurations. In addition, the system could also be used for ground-based equipment, such as loaders, semi-trucks, and other equipment that require common parts for use.

The manufacturing methods, materials, and systems described hereinafter as making up the various elements of the present disclosure are intended to be illustrative and not restrictive. Many suitable materials, struts, systems, and configurations that would perform the same or a similar function as the systems described herein are intended to be embraced within the scope of the disclosure. Such other systems and methods not described herein can include, but are not limited to, vehicles, systems, networks, materials, and technologies that are developed after the time of the development of the disclosure.

Referring now to FIG. 1A, a modular aircraft 100 is presented in isometric view and exploded view. Modular aircraft 100 includes at least a common component 104. At least a common component 104 may include any portion of modular aircraft 100 that remains the same across a family of aircraft. For the purposes of this disclosure, at least a "common component" is one or more components of a modular aircraft that remain constant across a family of aircraft having a portion of common components, especially blended wing body (BWB) aircraft. For the purposes of this disclosure, "blended wing body aircraft" are aircraft having a blended wing body. As used in this disclosure, A "blended wing body" (BWB), also known as a "blended body" or a "hybrid wing body" (HWB), is a fixed-wing aircraft having no clear dividing line between wings and a main body of the aircraft at a leading edge of the wings. For example, a BWB aircraft may have distinct wing and body structures, which are smoothly blended together with no clear dividing line or demarcation between wing and fuselage. This contrasts with a flying wing, which has no distinct fuselage, and a lifting body, which has no distinct wings. A BWB design may or may not be tailless. One of the main advantages of the BWB is to reduce wetted area and the accompanying form drag associated with a conventional wing-body junction. It may also be given a wide airfoil-shaped body, allowing the entire craft to generate lift and thus reducing the size and drag of the wings. It should be noted by one of ordinary skill in the art that there is a plurality of designs of BWB aircraft that may be applied in embodiments of this disclosure. The BWB is a hybrid shape that resembles a flying wing, but also incorporates features from conventional transport aircraft. This combination offers several advantages over conventional tube- and wing airframes. The BWB airframe merges efficient high-lift wings with a wide airfoil-shaped body, allowing the entire aircraft to generate lift and minimize drag. This shape helps to increase fuel economy and creates larger payload (cargo or passenger) areas in the center body portion of the aircraft.

The BWB shape allows unique interior designs. Cargo can be loaded or passengers can board from the front or rear of the aircraft. The cargo or passenger area is distributed across the wide fuselage, providing a large usable volume. For passengers in the interior of the craft, real-time video at every seat would take the place of window seats.

With continued reference to FIG. 1, modular aircraft 100 includes at least a common component 104 which comprises at least a flight component. At least a flight component may be consistent with any description of a flight component herein, such as propulsors, control surfaces, rotors, paddle wheels, engines, propellers, wings, winglets, or the like. For the purposes of this disclosure, at least a "flight component" is at least one element of a modular aircraft configured to manipulate a fluid medium such as air to propel, control, or maneuver an aircraft. In nonlimiting examples, at least a flight component may include a rotor connected to the rotor shaft of an electric motor further mechanically affixed to at least a portion of modular aircraft 100. In embodiments, at least a flight component may be a rotor attached to an electric motor configured to produce shaft torque and in turn, create lift in a hover configuration.

For the purposes of this disclosure, "torque", is the twisting force that tends to cause rotation. Torque is the rotational equivalent of linear force. In three dimensions, the torque is a pseudovector; for point particles, it is given by the cross product of the position vector (distance vector) and the force vector. The magnitude of torque of a rigid body depends on three quantities: the force applied, the lever arm vector connecting the point about which the torque is being measured to the point of force application, and the angle between the force and lever arm vectors. A force applied perpendicularly to a lever multiplied by its distance from the lever's fulcrum (the length of the lever arm) is its torque. A force of three newtons applied two meters from the fulcrum, for example, exerts the same torque as a force of one newton applied six meters from the fulcrum. The direction of the torque can be determined by using the right-hand grip rule: if the fingers of the right hand are curled from the direction of the lever arm to the direction of the force, then the thumb points in the direction of the torque. One of ordinary skill in the art would appreciate that torque is represented as a vector, consistent with this disclosure, and therefore includes a magnitude of force and a direction. "Torque" and "moment" are equivalents for the purposes of this disclosure. Any torque command or signal herein may include at least the steady state torque to achieve the torque output to at least a propulsor.

With continued reference to FIG. 1, at least a flight component may be one or more devices configured to alter modular vehicle 100 attitude. "Attitude", for the purposes of this disclosure, is the relative orientation of a body, in this case a modular aircraft 100, as compared to earth's surface or any other reference point and/or coordinate system. Attitude is generally displayed to pilots, personnel, remote users, or one or more computing devices in an attitude indicator, such as without limitation a visual representation of the horizon and its relative orientation to the aircraft. A plurality of attitude commands may indicate one or more measurements relative to an aircraft's pitch, roll, yaw, or throttle compared to a relative starting point. One or more sensors may measure or detect the aircraft's attitude and establish one or more attitude datums. An "attitude datum", for the purposes of this disclosure, refers to at least an element of data identifying and/or a pilot input or command. At least a pilot control may be communicatively connected to any other component presented in system, the communicative connection may include redundant connections configured to safeguard against single-point failure. A plurality of attitude commands may indicate a pilot's instruction to change the heading and/or trim of an electric aircraft. Pilot input may indicate a pilot's instruction to change an aircraft's pitch, roll, yaw, throttle, and/or any combination thereof. Aircraft trajectory may be manipulated by one or more control surfaces and propulsors working alone or in tandem consistent with the entirety of this disclosure, hereinbelow. "Pitch", for the purposes of this disclosure refers to an aircraft's angle of attack, that is the difference between the aircraft's nose and a horizontal flight trajectory. For example, an aircraft may pitch "up" when its nose is angled upward compared to horizontal flight, as in a climb maneuver. In another example, an aircraft may pitch "down", when its nose is angled downward compared to horizontal flight, like in a dive maneuver. When angle of attack is not an acceptable input to any system disclosed herein, proxies may be used such as pilot controls, remote controls, or sensor levels, such as true airspeed sensors, pitot tubes, pneumatic/hydraulic sensors, and the like. "Roll" for the purposes of this disclosure, refers to an aircraft's position about its longitudinal axis, that is to say that when an aircraft rotates about its axis from its tail to its nose, and one side rolls upward, as in a banking maneuver. "Yaw", for the purposes of this disclosure, refers to an aircraft's turn angle, when an aircraft rotates about an imaginary vertical axis intersecting the center of the earth and the fuselage of the aircraft. "Throttle", for the purposes of this disclosure, refers to an aircraft outputting an amount of thrust from a propulsor. Pilot input, when referring to throttle, may refer to a pilot's desire to increase or decrease thrust produced by at least a propulsor. An initial vehicle torque signal may include an electrical signal. Aircraft commands may include mechanical movement of any throttle consistent with the entirety of this disclosure. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. At least a sensor may include circuitry, computing devices, electronic components or a combination thereof that translates pilot input into an initial vehicle torque signal configured to be transmitted to another electronic component. A plurality of attitude commands may include a total attitude command datum, such as a combination of attitude adjustments represented by one or a certain number of combinatorial datums. A plurality of attitude commands may include individual attitude datums representing total or relative change in attitude measurements relative to pitch, roll, yaw, and throttle.

With continued reference to FIG. 1, modular aircraft 100 includes at least a common component 104 wherein the at least a common component 104 includes at least a portion of a wing. Modular aircraft 100 may comprise wings, empennages, nacelles, control surfaces, fuselages, and landing gear, among others, to name a few. Aircraft construction may comprise one or more of a plurality of construction methods that will be discussed further hereinbelow. In embodiments, an empennage may be disposed at the aftmost point of an aircraft body. The empennage may comprise the tail of the aircraft, further comprising rudders, vertical stabilizers, horizontal stabilizers, stabilators, elevators, trim tabs, among others. At least a portion of the empennage may be manipulated directly or indirectly by pilot commands to impart control forces on a fluid in which the aircraft is flying, most notably air. The manipulation of these empennage control surfaces may, in part, change an aircraft's heading in pitch, roll, and yaw. Pitch is about the transverse axis of an aircraft, centered at the center of gravity of an aircraft, parallel to a line connecting wing tip to wing tip. Roll is about the longitudinal axis of an aircraft with its origin at the center of gravity of an aircraft and parallel to the line connecting nose tip to empennage along fuselage. The yaw axis has its origin at the center of gravity and is directed down towards the bottom of the aircraft, a positive yaw angle, understood by a person of ordinary skill in the art to be when an aircraft's nose is moved to the right about its yaw axis, looking from aft, forward. A dual-mode aircraft may also comprise wings. Wings comprise structures which include airfoils configured to create a pressure differential resulting in lift. Wings are generally disposed on the left and right sides of the aircraft symmetrically, at a point between nose and empennage. Wings may comprise a plurality of geometries in planform view, swept swing, tapered, variable wing, triangular, oblong, elliptical, square, among others. Wings may be blended into the body of the aircraft such as in a BWB aircraft where no strong delineation of body and wing exists. A wing's cross section geometry comprises an airfoil. An "airfoil" as used in this disclosure, is a shape specifically designed such that a fluid flowing above and below it exert differing levels of pressure against the top and bottom surface. In embodiments, the bottom surface of an aircraft can be configured to generate a greater pressure than does the top, resulting in lift. A wing may comprise differing and/or similar cross-sectional geometries over its cord length or the length from wing tip to where wing meets the aircraft's body. One or more wings may be symmetrical about the aircraft's longitudinal plane, which comprises the longitudinal or roll axis reaching down the center of the aircraft through the nose and empennage, and the plane's yaw axis. Wings may comprise controls surfaces configured to be commanded by a pilot or pilots to change a wing's geometry and therefore its interaction with a fluid medium, like air. Control surfaces may comprise flaps, ailerons, tabs, spoilers, and slats, among others. The control surfaces may disposed on the wings in a plurality of locations and arrangements and in embodiments may be disposed at the leading and trailing edges of the wings, and may be configured to deflect up, down, forward, aft, or a combination thereof. An aircraft, including a dual-mode aircraft may comprise a combination of control surfaces to perform maneuvers while flying or on ground.

In general, a fixed wing aircraft and rotorcraft adhere to similar or the same physical principles, where a fixed wing aircraft may be pulled through a fluid by, for example, a jet engine, propelling an aircraft through a fluid while using wings to generate lift. A rotorcraft may use a different power source, which will be discussed below to propel a rotor, or set of airfoils, through a fluid medium, like air, generating lift. Rotorcraft, like helicopters, quadcopters, and the like may be well suited for hovering, due to their propulsion technique, where a fixed wing aircraft may be well suited for higher flight speeds. A dual-mode aircraft may take the inherent benefits from both aircraft types and integrate them. At least a common component 104 may include a winglet. For the purposes of this disclosure, a "winglet" is a flight component configured to manipulate a fluid medium and is mechanically attached to a wing or aircraft and may alternatively called a wingtip device. Wingtip devices are intended to improve the efficiency of fixed-wing aircraft by reducing drag. Although there are several types of wing tip devices which function in different manners, their intended effect is always to reduce an aircraft's drag by partial recovery of the tip vortex energy. Wingtip devices can also improve aircraft handling characteristics and enhance safety for following aircraft. Such devices increase the effective aspect ratio of a wing without greatly increasing the wingspan. Extending the span would lower lift-induced drag, but would increase parasitic drag and would require boosting the strength and weight of the wing. At some point, there is no net benefit from further increased span. There may also be operational considerations that limit the allowable wingspan (e.g., available width at airport gates).

Wingtip devices increase the lift generated at the wingtip (by smoothing the airflow across the upper wing near the tip) and reduce the lift-induced drag caused by wingtip vortices, improving lift-to-drag ratio. This increases fuel efficiency in powered aircraft and increases cross-country speed in gliders, in both cases increasing range. U.S. Air Force studies indicate that a given improvement in fuel efficiency correlates directly with the causal increase in the aircraft's lift-to-drag ratio. The term "winglet" was previously used to describe an additional lifting surface on an aircraft, like a short section between wheels on fixed undercarriage. The upward angle (or cant) of the winglet, its inward or outward angle (or toe), as well as its size and shape are critical for correct performance and are unique in each application. The wingtip vortex, which rotates around from below the wing, strikes the cambered surface of the winglet, generating a force that angles inward and slightly forward, analogous to a sailboat sailing close hauled. The winglet converts some of the otherwise-wasted energy in the wingtip vortex to an apparent thrust. This small contribution can be worthwhile over the aircraft's lifetime, provided the benefit offsets the cost of installing and maintaining the winglets.

Another potential benefit of winglets is that they reduce the intensity of wake vortices. Those trail behind the plane and pose a hazard to other aircraft. Minimum spacing requirements between aircraft operations at airports are largely dictated by these factors. Aircraft are classified by weight (e.g., "Light," "Heavy," etc.) because the vortex strength grows with the aircraft lift coefficient, and thus, the associated turbulence is greatest at low speed and high weight, which produced a high angle of attack.

Winglets and wingtip fences also increase efficiency by reducing vortex interference with laminar airflow near the tips of the wing, by 'moving' the confluence of low-pressure (over wing) and high-pressure (under wing) air away from the surface of the wing. Wingtip vortices create turbulence, originating at the leading edge of the wingtip and propagating backwards and inboard. This turbulence 'delaminates' the airflow over a small triangular section of the outboard wing, which destroys lift in that area. The fence/winglet drives the area where the vortex forms upward away from the wing surface, since the center of the resulting vortex is now at the tip of the winglet.

With continued reference to FIG. 1, modular aircraft 100 may include an energy source. The energy source may include any device providing energy to the plurality of propulsors; in an embodiment, the energy source provides electric energy to the plurality of propulsors. The energy source may include, without limitation, a generator, a photovoltaic device, a fuel cell such as a hydrogen fuel cell, direct methanol fuel cell, and/or solid oxide fuel cell, or an electric energy storage device; electric energy storage device may include without limitation a capacitor and/or inductor. The energy source and/or energy storage device may include at least a battery, battery cell, and/or a plurality of battery cells connected in series, in parallel, or in a combination of series and parallel connections such as series connections into modules that are connected in parallel with other like modules. Battery and/or battery cell may include, without limitation, Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode. In embodiments, the energy source may be used to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. The battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. A person of ordinary skill in the art, upon reviewing the entirety of this disclosure, will be aware of various devices of components that may be used as an energy source.

In further nonlimiting embodiments, an energy source may include liquid fuel. Aviation fuels are petroleum-based fuels, or petroleum and synthetic fuel blends, used to power aircraft. They have more stringent requirements than fuels used for ground use, such as heating and road transport, and contain additives to enhance or maintain properties important to fuel performance or handling. They are kerosene-based (JP-8 and Jet A-1) for gas turbine-powered aircraft. Piston-engined aircraft use gasoline and those with diesel engines may use jet fuel (kerosene). Specific energy is an important criterion in selecting fuel for an aircraft. The much higher energy storage capability of hydrocarbon fuels compared to batteries has so far prevented electric aircraft using electric batteries as the main propulsion energy store becoming viable for even small personal aircraft. Liquid fuel may include Jet-A. Jet-A powers modern commercial airliners and is a mix of extremely refined kerosene and burns at temperatures at or above 49° C. (120° F.). Kerosene-based fuel has a much higher flash point than gasoline-based fuel, meaning that it requires significantly higher temperature to ignite. It is a high-quality fuel; if it fails the purity and other quality tests for use on jet aircraft, it is sold to ground-based users with less demanding requirements, such as railroads.

With continued reference to FIG. 1, modular aircraft 100 may include an energy source which may include a fuel cell. For the purposes of this disclosure, a "fuel cell" is an electrochemical cell that converts the chemical energy of a fuel (often hydrogen) and an oxidizing agent (often oxygen) into electricity through a pair of redox reactions. Fuel cells are different from most batteries in requiring a continuous source of fuel and oxygen (usually from air) to sustain the chemical reaction, whereas in a battery the chemical energy comes from metals and their ions or oxides that are commonly already present in the battery, except in flow batteries. Fuel cells can produce electricity continuously for as long as fuel and oxygen are supplied. Fuel cells are used for primary and backup power for commercial, industrial and residential buildings and in remote or inaccessible areas.

In embodiments, fuel cells may consist of different types, but they all consist of an anode, a cathode, and an electrolyte that allows ions, often positively charged hydrogen ions (protons), to move between the two sides of the fuel cell. At the anode a catalyst causes the fuel to undergo oxidation reactions that generate ions (often positively charged hydrogen ions) and electrons. The ions move from the anode to the cathode through the electrolyte. At the same time, electrons flow from the anode to the cathode through an external circuit, producing direct current electricity. At the cathode, another catalyst causes ions, electrons, and oxygen to react, forming water and possibly other products. Fuel cells are classified by the type of electrolyte they use and by the difference in startup time ranging from 1 second for proton-exchange membrane fuel cells (PEM fuel cells, or PEMFC) to 10 minutes for solid oxide fuel cells (SOFC). A related technology is flow batteries, in which the fuel can be regenerated by recharging. Individual fuel cells produce relatively small electrical potentials, about 0.7 volts, so cells are "stacked", or placed in series, to create sufficient voltage to meet an application's requirements. In addition to electricity, fuel cells produce water, heat and, depending on the fuel source, very small amounts of nitrogen dioxide and other emissions. The energy efficiency of a fuel cell is generally between 40 and 60%; however, if waste heat is captured in a cogeneration scheme, efficiencies of up to 85% can be obtained.

With continued reference to FIG. 1, modular aircraft 100 may include fuel cells come in many varieties; however, they all work in the same general manner. They are made up of three adjacent segments: the anode, the electrolyte, and the cathode. Two chemical reactions occur at the interfaces of the three different segments. The net result of the two reactions is that fuel is consumed, water or carbon dioxide is created, and an electric current is created, which can be used to power electrical devices, normally referred to as the load. At the anode a catalyst oxidizes the fuel, which may be hydrogen, turning the fuel into a positively charged ion and a negatively charged electron. The electrolyte is a substance specifically designed so ions can pass through it, but the electrons cannot. The freed electrons travel through a wire creating the electric current. The ions travel through the electrolyte to the cathode. Once reaching the cathode, the ions are reunited with the electrons and the two react with a third chemical, such as oxygen, to create water or carbon dioxide.

Fuel cell design may feature the electrolyte substance, which defines the type of fuel cell, and can be made from a number of substances like potassium hydroxide, salt carbonates, and phosphoric acid. The most common fuel is hydrogen. Fuel cell may feature an anode catalyst, like fine platinum powder, breaks down the fuel into electrons and ions. Fuel cell may feature a cathode catalyst, often nickel, converts ions into waste chemicals, with water being the most common type of waste. A fuel cell may include a gas diffusion layers that are designed to resist oxidization.

With continued reference to FIG. 1, modular aircraft 100 may include an energy source which may include a cell such as a battery cell, or a plurality of battery cells making a battery module. An energy source may be a plurality of energy sources. The module may include batteries connected in parallel or in series or a plurality of modules connected either in series or in parallel designed to deliver both the power and energy requirements of the application. Connecting batteries in series may increase the voltage of an energy source which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of an energy source may be based on the individual battery cell performance or an extrapolation based on the measurement of at least an electrical parameter. In an embodiment where an energy source includes a plurality of battery cells, the overall power output capacity may be dependent on the electrical parameters of each individual cell. If one cell experiences high self-discharge during demand, power drawn from an energy source may be decreased to avoid damage to the weakest cell. An energy source may further include, without limitation, wiring, conduit, housing, cooling system and battery management system. Persons skilled in the art will be aware, after reviewing the entirety of this disclosure, of many different components of an energy source.

Modular aircraft 100 may include multiple propulsion sub-systems, each of which may have a separate energy source powering a separate plurality of propulsors. For instance, and without limitation, each propulsor of plurality of propulsors may have a dedicated energy source of at least an energy source. Alternatively, or additionally, a plurality of energy sources may each provide power to two or more propulsors, such as, without limitation, a "fore" energy source providing power to propulsors located toward the front of an aircraft, while an "aft" energy source provides power to propulsors located toward the rear of the aircraft. As a further non-limiting example, a single propulsor or group of propulsors may be powered by a plurality of energy sources. For example, and without limitation, two or more energy sources may power one or more propulsors; two energy sources may include, without limitation, at least a first energy source having high specific energy density and at least a second energy source having high specific power density, which may be selectively deployed as required for higher-power and lower-power needs. Alternatively, or additionally, a plurality of energy sources may be placed in parallel to provide power to the same single propulsor or plurality of propulsors. Alternatively, or additionally, two or more separate propulsion subsystems may be joined using intertie switches (not shown) causing the two or more separate propulsion subsystems to be treatable as a single propulsion subsystem or system, for which potential under load of combined energy sources may be used as the electric potential. Persons skilled in the art, upon reviewing the entirety of this disclosure, will be aware of various combinations of energy sources that may each provide power to single or multiple propulsors in various configurations.

With continued reference to FIG. 1, modular aircraft 100 includes at least a common component 104 which may further include a nose portion. A nose portion for the purposes of this disclosure refers to any portion of the aircraft forward of the aircraft's fuselage. Nose portion may comprise a cockpit (for manned aircraft), canopy, aerodynamic fairings, windshield, and/or any structural elements required to support mechanical loads. Nose portion may also include pilot seats, control interfaces, gages, displays, inceptor sticks, throttle controls, collective pitch controls, and/or communication equipment, to name a few. Nose portion, for the purposes of this disclosure may comprise a swing nose configuration. A swing nose may be characterized by the ability of the nose to move, manually or automatically, into a differing orientation than its flight orientation to provide an opening for loading a payload into aircraft fuselage from the front of the aircraft. Nose may be configured to open in a plurality of orientations and directions.

With continued reference to FIG. 1, modular aircraft 100 includes at least a common component 104 which may further include a control surface configured to manipulate a fluid medium. Control surfaces may comprise a plurality of geometries in planform view, swept swing, tapered, variable wing, triangular, oblong, elliptical, square, among others. Wings may be blended into the body of the aircraft such as in a BWB aircraft where no strong delineation of body and wing exists. A wing's cross section geometry comprises an airfoil. An airfoil may include a shape specifically designed such that a fluid flowing above and below it exert differing levels of pressure against the top and bottom surface. In embodiments, the bottom surface of an aircraft can be configured to generate a greater pressure than does the top, resulting in lift. A wing may comprise differing and/or similar cross-sectional geometries over its cord length or the length from wing tip to where wing meets the aircraft's body. One or more wings may be symmetrical about the aircraft's longitudinal plane, which comprises the longitudinal or roll axis reaching down the center of the aircraft through the nose and empennage, and the plane's yaw axis. Wings may comprise controls surfaces configured to be commanded by a pilot or pilots to change a wing's geometry and therefore its interaction with a fluid medium, like air. Control surfaces may comprise flaps, ailerons, tabs, spoilers, and slats, among others. The control surfaces may disposed on the wings in a plurality of locations and arrangements and in embodiments may be disposed at the leading and trailing edges of the wings, and may be configured to deflect up, down, forward, aft, or a combination thereof. An aircraft, including a dual-mode aircraft may comprise a combination of control surfaces to perform maneuvers while flying or on ground.

With continued reference to FIG. 1, modular aircraft 100 includes at least a common component 104 which may further include at least a nacelle. For the purposes of this disclosure, a "nacelle" a streamlined body sized according to what it contains such as an engine, fuel, or equipment on an aircraft. When attached by a pylon entirely outside the airframe it is sometimes called a pod in which case it is attached with a pylon or strut and the engine is known as a podded engine. In some cases an aircraft cockpit may also be housed in a nacelle, rather than in a conventional fuselage. At least a nacelle may substantially encapsulate a propulsor, which may include a motor. At least a nacelle may be connected to at least a portion of modular aircraft 100 partially or wholly enveloped by the outer mold line of modular aircraft 100. At least a nacelle may be designed to be streamlined. At least a nacelle may substantially encapsulate an engine. At least a nacelle may be asymmetrical about a plane comprising the longitudinal axis of the engine and the yaw axis of modular aircraft 100.

With continued reference to FIG. 1, a "propulsor", as used herein, is a component or device used to propel a craft by exerting force on a fluid medium, which may include a gaseous medium such as air or a liquid medium such as water. For the purposes of this disclosure, "substantially encapsulate" is the state of a first body surrounding all or most of a second body wherein the first and second bodies include a first and second surface disposed opposite and adjacent to each other, respectively. A motor may include without limitation, any electric motor, where an electric motor is a device that converts electrical energy into mechanical energy, for instance by causing a shaft to rotate. A motor may be driven by direct current (DC) electric power; for instance, a motor may include a brushed DC motor or the like. A motor may be driven by electric power having varying or reversing voltage levels, such as alternating current (AC) power as produced by an alternating current generator and/or inverter, or otherwise varying power, such as produced by a switching power source. A motor may include, without limitation, a brushless DC electric motor, a permanent magnet synchronous motor, a switched reluctance motor, and/or an induction motor; persons skilled in the art, upon reviewing the entirety of this disclosure, will be aware of various alternative or additional forms and/or configurations that a motor may take or exemplify as consistent with this disclosure. In addition to inverter and/or switching power source, a circuit driving motor may include electronic speed controllers (not shown) or other components for regulating motor speed, rotation direction, torque, and/or dynamic braking. Motor may include or be connected to one or more sensors detecting one or more conditions of motor; one or more conditions may include, without limitation, voltage levels, electromotive force, current levels, temperature, current speed of rotation, position sensors, and the like. For instance, and without limitation, one or more sensors may be used to detect back-EMF, or to detect parameters used to determine back-EMF, as described in further detail below. One or more sensors may include a plurality of current sensors, voltage sensors, and speed or position feedback sensors. One or more sensors may communicate a current status of motor to a person operating system or a computing device; computing device may include any computing device as described below, including without limitation, a vehicle controller. Computing device may use sensor feedback to calculate performance parameters of motor, including without limitation a torque versus speed operation envelope. Persons skilled in the art, upon reviewing the entirety of this disclosure, will be aware of various devices and/or components that may be used as or included in a motor or a circuit operating a motor, as used and described in this disclosure. In an embodiment, propulsors may receive differential power consumption commands, such as a propeller or the like receiving command to generate greater power output owing a greater needed contribution to attitude control, or a wheel receiving a greater power output due to worse traction than another wheel under slippery conditions.

A motor may be connected to a thrust element. Thrust element may include any device or component that converts the mechanical energy of the motor, for instance in the form of rotational motion of a shaft, into thrust in a fluid medium. Thrust element may include, without limitation, a device using moving or rotating foils, including without limitation one or more rotors, an airscrew or propeller, a set of airscrews or propellers such as contra-rotating propellers or co-rotating propellers, a moving or flapping wing, or the like. Thrust element may include without limitation a marine propeller or screw, an impeller, a turbine, a pump-jet, a paddle or paddle-based device, or the like. Thrust element may include a rotor. Persons skilled in the art, upon reviewing the entirety of this disclosure, will be aware of various devices that may be used as thrust element.

A thrust element may include any device or component that converts mechanical energy of a motor, for instance in the form of rotational motion of a shaft, into thrust within a fluid medium. A thrust element may include, without limitation, a device using moving or rotating foils, including without limitation one or more rotors, an airscrew or propeller, a set of airscrews or propellers such as contra-rotating propellers, a moving or flapping wing, or the like. A thrust element may include without limitation a marine propeller or screw, an impeller, a turbine, a pump-jet, a paddle or paddle-based device, or the like. As another non-limiting example, a thrust element may include an eight-bladed pusher propeller, such as an eight-bladed propeller mounted behind the engine to ensure the drive shaft is in compression.

In nonlimiting embodiments, at least a flight component may include an airbreathing engine such as a jet engine, turbojet engine, turboshaft engine, ramjet engine, scramjet engine, hybrid propulsion system, turbofan engine, or the like. At least a flight component may be fueled by Jet-A, Jet-B, diesel fuel, gasoline, or the like.

In nonlimiting embodiments, a jet engine is a type of reaction engine discharging a fast-moving jet that generates thrust by jet propulsion. While this broad definition can include rocket, water jet, and hybrid propulsion, the term jet engine typically refers to an internal combustion airbreathing jet engine such as a turbojet, turbofan, ramjet, or pulse jet. In general, jet engines are internal combustion engines.

In nonlimiting embodiments, airbreathing jet engines feature a rotating air compressor powered by a turbine, with the leftover power providing thrust through the propelling nozzle—this process is known as the Brayton thermodynamic cycle. Jet aircraft use such engines for long-distance travel. Early jet aircraft used turbojet engines that were relatively inefficient for subsonic flight. Most modern subsonic jet aircraft use more complex high-bypass turbofan engines. They give higher speed and greater fuel efficiency than piston and propeller aeroengines over long distances. A few air-breathing engines made for highspeed applications (ramjets and scramjets) use the ram effect of the vehicle's speed instead of a mechanical compressor.

An airbreathing jet engine (or ducted jet engine) is a jet engine that emits a jet of hot exhaust gases formed from air that is forced into the engine by several stages of centrifugal, axial or ram compression, which is then heated and expanded through a nozzle. They are typically gas turbine engines. The majority of the mass flow through an airbreathing jet engine is provided by air taken from outside of the engine and heated internally, using energy stored in the form of fuel.

All practical airbreathing jet engines are internal combustion engines that directly heat the air by burning fuel, with the resultant hot gases used for propulsion via a propulsive nozzle, although other techniques for heating the air have been experimented with (such as nuclear jet engines). Most modern jet engine designs are turbofans, which have largely replaced turbojets. These modern engines use a gas turbine engine core with high overall pressure ratio (about 40:1 in 1995) and high turbine entry temperature (about 1800 K in 1995) and provide a great deal of their thrust with a turbine-powered fan stage, rather than with pure exhaust thrust as in a turbojet. These features combine to give a high efficiency, relative to a turbojet. A few jet engines use simple ram effect (ramjet) or pulse combustion (pulsejet) to give compression. Persons skilled in the art, upon reviewing the entirety of this disclosure, will be aware of various devices that may be used as a thrust element.

With continued reference to FIG. 1, modular aircraft 100 includes at least a modular component 108. As used in this disclosure, a "modular component" is at least an aircraft component that is configured to produce a continuous outer mold line of the aircraft when connected to the at least a common component 104. Unlike the at least a common component 104. Modular component 108 may be selected from a plurality of aircraft components, for example as a function of desired aircraft configuration. For the purposes of this disclosure, "outer mold line" is the outermost surface of an object at any radial point from a center of the object. For example, and without limitation, the outer mold line of an aircraft may include most of the aircraft's skin. For the purpose of this disclosure, "continuous" is the characteristic of aircraft skin to have unbroken streamlines and no discontinuities over the plurality of modular components present in modular aircraft 100. For example and without limitation, modular aircraft 100 may include at least a modular component 108 of a first size including continuous outer mold line when connected to at least a common component 104 (which always remains the same size, as it is common. Alternatively, modular aircraft 100 may include at least a modular component 108 of a second size and shape, wherein the outer mold line is still continuous when connected to at least a common component 104.

With continued reference to FIG. 1, modular aircraft 100 includes at least a modular component 108, wherein the at least a modular component 108 may include at least a structural component of the aircraft. Structural elements to provide physical stability during the entirety of the aircraft's flight envelope, while on ground, and during normal operation Structural elements may comprise struts, beams, formers, stringers, longerons, interstitials, ribs, structural skin, doublers, straps, spars, or panels, to name a few. Structural elements may also comprise pillars. In automobile construction especially, and for the purpose of aircraft cockpits comprising windows/windshields, pillars may include vertical or near vertical supports around the window configured to provide extra stability around weak points in a vehicle's structure, such as an opening where a window is installed. Where multiple pillars are disposed in an aircraft's structure, they may be so named A, B, C, and so on named from nose to tail. Pillars, like any structural element for the purposes of this disclosure, may be disposed a distance away from each other, along the exterior of modular aircraft 100 and fuselage component 112. Depending on manufacturing method of fuselage component 112, pillars may be integral to frame and skin, comprised entirely of internal framing, or alternatively, may be only integral to structural skin elements. Structural skin will be discussed in greater detail below in this paper.

At least a modular component 108 may comprise a plurality of materials, alone or in combination, in its construction. At least a modular component 108, in an illustrative embodiment may comprise a welded steel tube frame further configured to form the general shape of nose corresponding to the arrangement of steel tubes. The steel may comprise a plurality of alloyed metals, including but not limited to, a varying amount of manganese, nickel, copper, molybdenum, silicon, and/or aluminum, to name a few. The welded steel tubes may be covered in any of a plurality of materials suitable for aircraft skin. Some of these may include carbon fiber, fiberglass panels, cloth-like materials, aluminum sheeting, or the like, to name a few. It is to be noted that general aircraft construction methods will be discussed further below in this paper, but similar or the same methods may be used to construct at least a modular component 108 as any other part of aircraft, namely fuselage component 112, among others, depending on function and location. At least a modular component 108 may comprise aluminum tubing mechanically coupled in various and unique orientations. The mechanical fastening of aluminum members (whether pure aluminum or alloys) may comprise temporary or permanent mechanical fasteners appreciable by one of ordinary skill in the art including, but not limited to, screws, nuts and bolts, anchors, clips, welding, brazing, crimping, nails, blind rivets, pull-through rivets, pins, dowels, snap-fits, and clamps, to name a few. At least a modular component 108 may additionally or alternatively use wood or another suitably strong yet light material for an internal structure.

Modular aircraft 100 may include monocoque or semi-monocoque construction. These methods of aircraft construction will be discussed at length later in this paper, but for the purpose of at least a modular component 108 the internal bracing structure need not be present if the aircraft skin provides sufficient structural integrity for aerodynamic force interaction, integral to skin if the preceding is untrue, or integral to aircraft skin itself. At least modular component 108, as well as any other component as described herein may include carbon fiber. "Carbon fiber", for the purposes of this disclosure may refer to carbon fiber reinforced polymer, carbon fiber reinforced plastic, or carbon fiber reinforced thermoplastic (CFRP, CRP, CFRTP, carbon composite, or just carbon, depending on industry). "Carbon fiber," as used in this disclosure, is a composite material including a polymer reinforced with carbon. In general, carbon fiber composites consist of two parts, a matrix and a reinforcement. In carbon fiber reinforced plastic, the carbon fiber constitutes the reinforcement, which provides strength. The matrix can include a polymer resin, such as epoxy, to bind reinforcements together. Such reinforcement achieves an increase in CFRP's strength and rigidity, measured by stress and elastic modulus, respectively. In embodiments, carbon fibers themselves can each comprise a diameter between 5-10 micrometers and include a high percentage (i.e. above 85%) of carbon atoms. A person of ordinary skill in the art will appreciate that the advantages of carbon fibers include high stiffness, high tensile strength, low weight, high chemical resistance, high temperature tolerance, and low thermal expansion. According to embodiments, carbon fibers may be combined with other materials to form a composite, when permeated with plastic resin and baked, carbon fiber reinforced polymer becomes extremely rigid. Rigidity, for the purposes of this disclosure, is analogous to stiffness, and is generally measured using Young's Modulus. Colloquially, rigidity may be defined as the force necessary to bend a material to a given degree. For example, ceramics have high rigidity, which can be visualized by shattering before bending. In embodiments, carbon fibers may additionally, or alternatively, be composited with other materials like graphite to form reinforced carbon-carbon composites, which include high heat tolerances over 2000 degrees Celsius (3632 degrees Fahrenheit). A person of skill in the art will further appreciate that aerospace applications require high-strength, low-weight, high heat resistance materials in a plurality of roles where carbon fiber exceeds such as fuselages, fairings, control surfaces, and structures, among others.

With continued reference to FIG. 1, modular aircraft 100 includes at least a modular component 108 which includes at least a fuselage component 112. A fuselage, for the purposes of this disclosure, refers to the main body of an aircraft, or in other words, the entirety of the aircraft except for the cockpit, nose, wings, empennage, nacelles, any and all control surfaces, and generally contains an aircraft's payload. At least a fuselage component 112 may comprise structural elements that physically support the shape and structure of an aircraft. Structural elements may take a plurality of forms, alone or in combination with other types. Structural elements vary depending on the construction type of aircraft and specifically, the fuselage.

At least a fuselage component 112 may include a truss structure. A truss structure is often used with a lightweight aircraft and comprises welded steel tube trusses. A "truss," as used in this disclosure, is an assembly of beams that create a rigid structure, often in combinations of triangles to create three-dimensional shapes. A truss structure may alternatively comprise wood construction in place of steel tubes, or a combination thereof. In embodiments, structural elements 204 can comprise steel tubes and/or wood beams. Aircraft skin 208 may be layered over the body shape constructed by trusses. Aircraft skin 208 may comprise a plurality of materials such as plywood sheets, aluminum, fiberglass, and/or carbon fiber, the latter of which will be addressed in greater detail later in this paper.

In embodiments, at least a fuselage 112 may comprise geodesic construction. Geodesic structural elements include stringers wound about formers (which may be alternatively called station frames) in opposing spiral directions. A stringer, for the purposes of this disclosure is a general structural element that comprises a long, thin, and rigid strip of metal or wood that is mechanically coupled to and spans the distance from, station frame to station frame to create an internal skeleton on which to mechanically couple aircraft skin. A former (or station frame) can include a rigid structural element that is disposed along the length of the interior of at least a fuselage component orthogonal to the longitudinal (nose to tail) axis of the aircraft and forms the general shape of at least a fuselage 112. A former may comprise differing cross-sectional shapes at differing locations along at least a fuselage 112, as the former is the structural element that informs the overall shape of a at least a fuselage 112 curvature. In embodiments, aircraft skin can be anchored to formers and strings such that the outer mold line of the volume encapsulated by the formers and stringers comprises the same shape as aircraft when installed. In other words, former(s) may form a fuselage's ribs, and the stringers may form the interstitials between such ribs. The spiral orientation of stringers about formers provide uniform robustness at any point on an aircraft fuselage such that if a portion sustains damage, another portion may remain largely unaffected. Aircraft skin would be mechanically coupled to underlying stringers and formers and may interact with a fluid, such as air, to generate lift and perform maneuvers.

According to embodiments, at least a fuselage 112 can comprise monocoque construction. Monocoque construction can include a primary structure that forms a shell (or skin in an aircraft's case) and supports physical loads. Monocoque fuselages are fuselages in which the aircraft skin or shell is also the primary structure. In monocoque construction aircraft skin would support tensile and compressive loads within itself and true monocoque aircraft can be further characterized by the absence of internal structural elements. Aircraft skin in this construction method is rigid and can sustain its shape with no structural assistance form underlying skeleton-like elements. Monocoque fuselage may comprise aircraft skin made from plywood layered in varying grain directions, epoxy-impregnated fiberglass, carbon fiber, or any combination thereof.

According to embodiments, at least a fuselage 112 can include a semi-monocoque construction. Semi-monocoque construction, as used in this disclosure, is used interchangeably with partially monocoque construction, discussed above. In semi-monocoque construction, at least a fuselage 112 may derive some structural support from stressed aircraft skin and some structural support from underlying frame structure made of structural elements. Formers or station frames can be seen running transverse to the long axis of at least a fuselage 112 with circular cutouts which are generally used in real-world manufacturing for weight savings and for the routing of electrical harnesses and other modern on-board systems. In a semi-monocoque construction, stringers are the thin, long strips of material that run parallel to fuselage's long axis. Stringers can be mechanically coupled to formers permanently, such as with rivets. Aircraft skin can be mechanically coupled to stringers and formers permanently, such as by rivets as well. A person of ordinary skill in the art will appreciate that there are numerous methods for mechanical fastening of the aforementioned components like crews, nails, dowels, pins, anchors, adhesives like glue or epoxy, or bolts and nuts, to name a few. A subset of fuselage under the umbrella of semi-monocoque construction is unibody vehicles. Unibody, which is short for "unitized body" or alternatively "unitary construction", vehicles are characterized by a construction in which the body, floor plan, and chassis form a single structure. In the aircraft world, unibody would comprise the internal structural elements like formers and stringers are constructed in one piece, integral to the aircraft skin (body) as well as any floor construction like a deck.

Stringers and formers which account for the bulk of any aircraft structure excluding monocoque construction can be arranged in a plurality of orientations depending on aircraft operation and materials. This disclosure serves in no way to limit the arrangement of load-bearing members used in the construction of modular aircraft 100. Stringers may be arranged to carry axial (tensile or compressive), shear, bending or torsion forces throughout their overall structure. Due to their coupling to aircraft skin, aerodynamic forces exerted on aircraft skin will be transferred to stringers. The location of said stringers greatly informs the type of forces and loads applied to each and every stringer, all of which may be handled by material selection, cross-sectional area, and mechanical coupling methods of each member. The same assessment may be made for formers. In general, formers are significantly larger in cross-sectional area and thickness, depending on location, than stringers. Both stringers and formers may comprise aluminum, aluminum alloys, graphite epoxy composite, steel alloys, titanium, or an undisclosed material alone or in combination.

Stressed skin, when used in semi-monocoque construction is the concept where the skin of an aircraft bears partial, yet significant, load in the overall structural hierarchy. In other words, the internal structure, whether it be a frame of welded tubes, formers and stringers, or some combination, is not sufficiently strong enough by design to bear all loads. The concept of stressed skin is applied in monocoque and semi-monocoque construction methods of at least a fuselage 112. Monocoque comprises only structural skin, and in that sense, aircraft skin undergoes stress by applied aerodynamic fluids imparted by the fluid. Stress as used in continuum mechanics can be described in pound-force per square inch (lbf/in$^2$) or Pascals (Pa). In semi-monocoque construction stressed skin bears part of the aerodynamic loads and additionally imparts force on the underlying structure of stringers and formers.

A person of ordinary skill in the art will appreciate a beam to be supporting the floor, or in other words the surface on which a passenger, operator, passenger, payload, or other object would rest on due to gravity when modular aircraft 100 is in its level flight orientation or sitting on ground. A beam acts similarly to stringer in that it is configured to support axial loads in compression due to a load being applied parallel to its axis in its illustrated orientation, due to, for example, a heavy object being placed on the floor of at least a fuselage 112. Strut is also illustrated in an exemplary embodiment. A strut may be disposed in or on any portion of at least a fuselage 112 that requires additional bracing, specifically when disposed transverse to another structural element, like a beam, that would benefit from support in that direction, opposing applied force. A strut may be disposed in a plurality of locations and orientations within at least a fuselage 112 as necessitated by operational and constructional requirements.

In embodiments, at least a fuselage 112 may be configurable based on the needs of the modular aircraft 100 per specific mission or objective. The general arrangement of components, structural elements, and hardware associated with storing and/or moving a payload may be added or removed from at least a fuselage 112 as needed, whether it is stowed manually, automatedly, or removed by personnel altogether. At least a fuselage 112 may be configurable for a plurality of storage options. Bulkheads and dividers may be installed and uninstalled as needed, as well as longitudinal dividers where necessary. Bulkheads and dividers may be installed using integrated slots and hooks, tabs, boss and channel, or hardware like bolts, nuts, screws, nails, clips, pins, and/or dowels, to name a few. At least a fuselage 112 may also be configurable to accept certain specific cargo containers, or a receptable that can, in turn, accept certain cargo containers.

At least a fuselage component 112 may include an interior cavity. An interior cavity may include a volumetric space configurable to include passenger seats and/or cargo. An interior cavity may be configured to include receptacles for fuel tanks, batteries, fuel cells, or other propellants as described herein.

With continued reference to FIG. 1, modular aircraft 100 includes at least a modular component 108 which include a collar component 116. For the purposes of this disclosure, a "collar component" is a portion of the at least a modular component disposed aft of the common nose portion extending the lateral width of the aircraft and including a transitional cross-sectional shape. Collar component 116 may be connected to the nose portion at a first end and the at least a fuselage component at a second end opposite the nose portion. In nonlimiting embodiments collar component 116 may be one continuous component with at least a fuselage component 112. Collar component 116 may include one or more openings configured to be passenger doors. Collar component 116 may include one or more openings configured to be cargo doors, hatches, portals, or the like. In nonlimiting embodiments collar component 116 may include any structure as disclosed herein such a stringer and station frame or structural skin construction. In nonlimiting embodiments collar component 116 may include one or more aerodynamic surfaces configured to generate lift or serve as control surfaces as described herein.

With continued reference to FIG. 1, modular aircraft 100 may include modular beaver tail 120. Modular beaver tail 120 is at least a modular component 108 disposed at the aft end of the modular aircraft 100. For the purposes of this disclosure, "beaver tail" is a portion of a BWB aircraft disposed at the aft of the aircraft configured to support flight components such as control surfaces and serve as a mounting point for one or more propulsors such as nacelles substantially encapsulating jet engines. Modular beaver tail 120 may be configured to modify the lateral width of the aft section of modular aircraft 100. Modular beaver tail 120 may include a plurality of modular beaver tails 120 such as two, three, four, five, or six beaver tails disposed at the after of modular aircraft 100. Modular beaver tail 120 may include control surfaces disposed solely on the individual beaver tail or spanning the trailing edge of modular aircraft 100 and therefore modular beaver tail 120 would include only a portion of the control surfaces thereon.

With continued reference to FIG. 1, modular aircraft 100 includes at least an interface component 124, wherein the at least an interface component 124 is configured to connect the at least a common component 104 at a first end to the at least a modular component 108 at a second end. As used in this disclosure, an "interface component" is an aircraft component that connects a common component and a modular component. At least an interface component 124 may include a latching mechanism. Latching element may comprise a pin, but alternatively or additionally may comprise a loop, D-ring, slot, channel, opening, hole, or another undisclosed type, to name a few. Latching element may be disposed in or on a surface of payload pallet, alone or one amongst a plurality of latching elements. Latching element may be disposed evenly or irregularly spaced along a surface or multiple surfaces of payload pallet. Latching element may comprise a component mechanically coupled to payload pallet or a component integral to payload pallet itself. One or ordinary skill in the art would appreciate that latching element may be disposed in a plurality of locations on at least an interface component 124. In a non-limiting example, latching mechanism may comprise a hook to capture at least a portion of latching element. One of ordinary skill in the art would appreciate that the mechanical shape and properties of one latching element may inform the mechanical shape and properties of latching mechanism that captures at least a portion of it. In other words, and in a non-limiting example, a plurality of latching elements may require a plurality of latching mechanisms. This example in no way limits the embodiments the latching mechanism or element may take, and in no way precludes the use of latching mechanism with any one or more of a plurality latching elements and vice versa.

Latching mechanism may be actuated manually or automatedly. Latching mechanism may comprise spring loaded elements that allow for at least a modular component 108 to move past at least a common component 104 in a first direction, actuate latching mechanism on the way by, and latch on to latching element and hinder movement of at least a modular component 108 in a second direction. Latching mechanism may be mechanically actuated to the capture position by a moving payload pallet as previously described or manually by personnel operating modular aircraft 100. Additionally, or alternatively, latching mechanism may be actuated automatedly by a plurality of methods. In a non-limiting example, a pilot from the cockpit may command latching mechanism to the capture position or the release position electronically through any of the actuation systems disclosed above in this paper like hydraulics, pneumatics, or electromechanical, to name a few. These disclosed actuation systems may drive latching mechanism to a capture position, release position, or any other intermediate or extreme position relative to latching element and fuselage.

Latching mechanism, latching element, payload pallet, may comprise suitable materials for high-strength, low-weight applications one of ordinary skill in the art of aircraft manufacture, passenger airlines, airline freighting would appreciate there is a vast plurality of materials suitable for construction of this payload system in a modular aircraft. Some materials used may include aluminum and aluminum alloys, steel and steel alloys, titanium and titanium alloys, carbon fiber, fiberglass, various plastics including acrylonitrile butadiene styrene (ABS), high-density polyethylene (HDPE), and even wood, to name a few.

With continued reference to FIG. 1, at least an interface component 124 may include one or more mating surfaces including a male portion disposed on at least a common component 104 and a female portion disposed on at least a modular component 108. At least an interface component 124 may be configured to align at least a common component 104 and at least a modular component 108 when the male portion is substantially encapsulated by the female portion. At least an interface component 124 may include a plurality of male and accompanying female portions disposed at a plurality of locations on modular aircraft 100. At least an interface component 124 may include alignment pins, holes, channels, bosses, slots, or the like to align components for assembly. At least an interface component 124 may include matched drilling components and riveting, bolting, screwing, doweling, or otherwise mechanically fastening at least a common component 104 and at least a modular component 108 to one another. In some embodiments, interface component 124 may be integrated into one or more of modular component 108 and common component 104. Alternatively or additionally, in some cases, an interface component 124 may include one or more fasteners. Fasteners may include without limitation nuts, bolts, screws, rivets, and the like.

According to some embodiments, interface component may allow for variable adjustment of one or more degrees of freedom of a common component 104 relative a modular component 108. For instance, in some cases, wings 104 may be attached at a variable angle, i.e., swept back. In some cases, the interface component may include structure components that introduce a sweep angle to the wings. Exemplary no limiting sweep angles include angles within a range of about 1° to about 15°. In some embodiments, wing sweep may be added to affect fuel efficiency. Alternatively or additionally, wing sweep may be varied depending upon desired operational speed of aircraft. For instance, in some embodiments, swept wings may delay shock waves and accompanying aerodynamic drag rise caused by fluid compressibility, when travelling near a speed of sound (e.g, no less than about Mach 0.5). Alternatively or additionally, a variable sweep angle may be used for other reasons, such as without limitation to limit drag, limit observability, or improve pilot visibility.

Figure 1B:
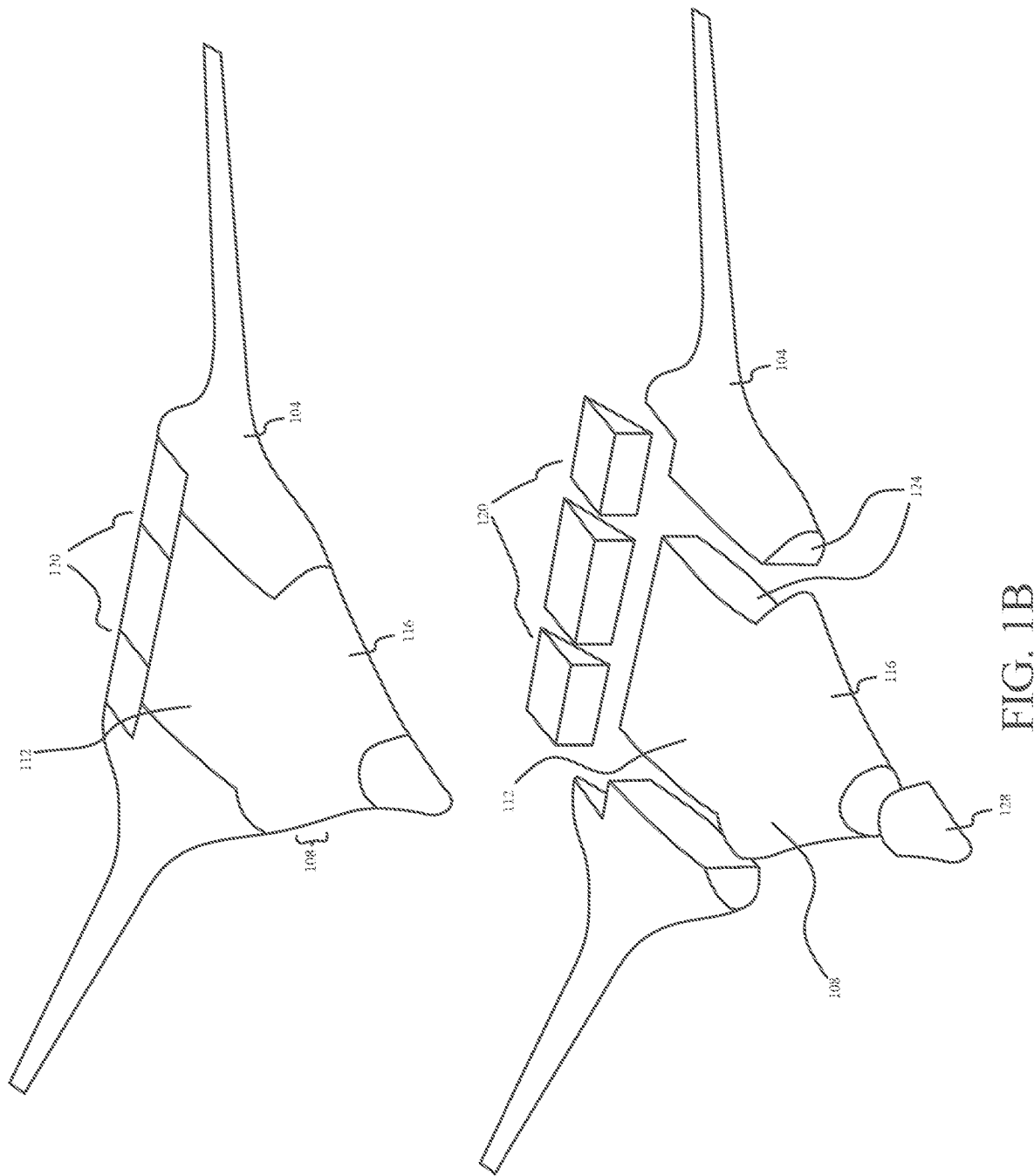
FIG. 1B is an illustration of an exemplary embodiment of a modular aircraft shown in isometric and exploded views.

Referring now to FIG. 1B, modular aircraft 100 is illustrated with at least a modular component 108 of a second, larger size than FIG. 1A. It should be noted that one of ordinary skill in the art would understand that at least a common component 104 is of the exact same dimensions and functions between FIGS. 1A and 1B. At least a modular component 108 may be configured to serve a different purpose depending on its size, such as passenger carrying, cargo, fuel tanking, or the like. In nonlimiting examples, at least a modular component 108 may include a plurality of sizes, shapes, configurations, or a combination thereof for the same mission set, such as passenger carrying or cargo.

Figure 2:
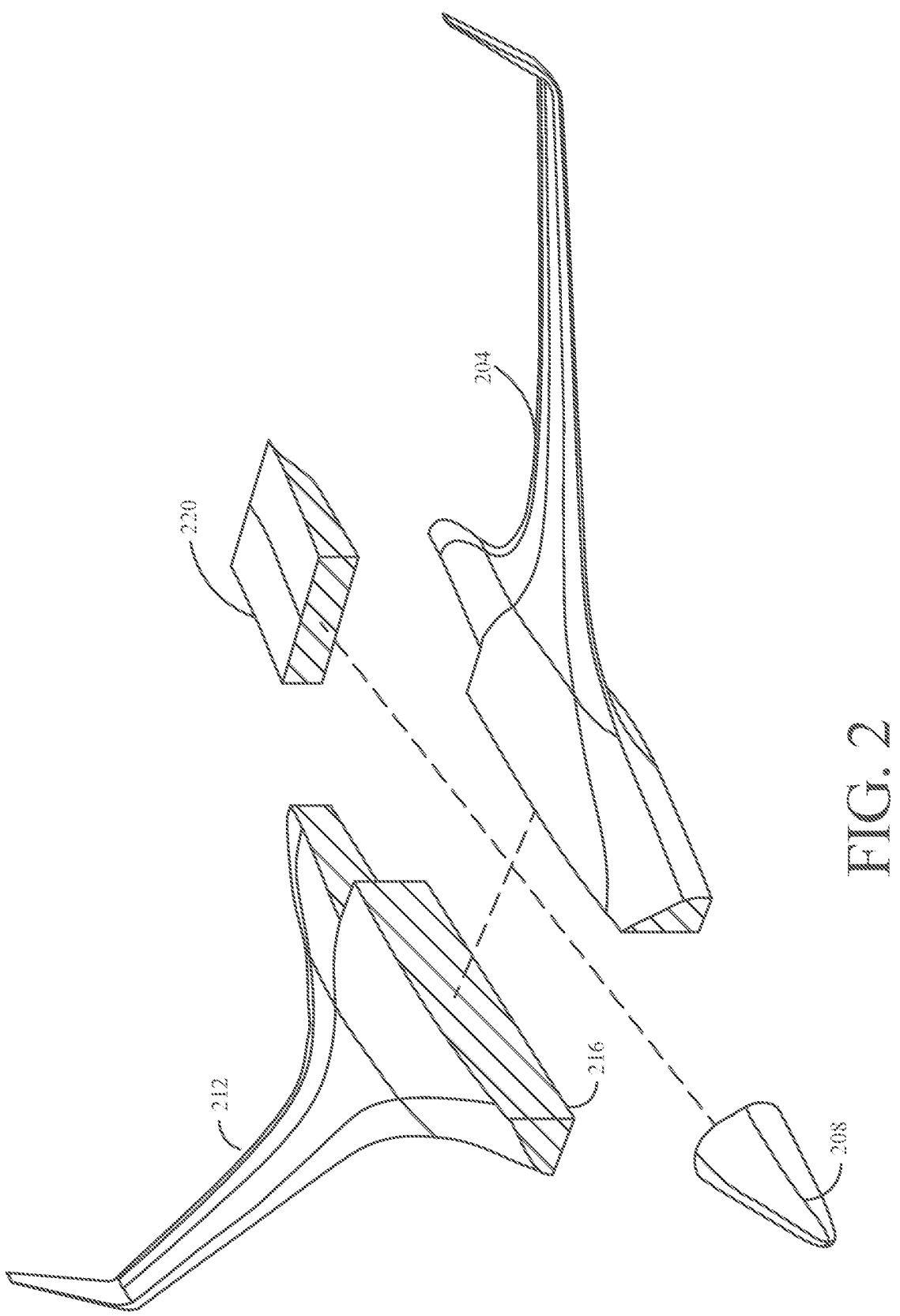
FIG. 2 is an illustration of an exemplary embodiment of at least a common component shown in isometric exploded view.

With continued reference to FIG. 2, a plurality of common components 200 is illustrated in relative positioning within modular aircraft 100. Plurality of common components 200 includes at least a flight component 204, which may be the same or similar to at least a flight component as described herein.

With continued reference to FIG. 2, plurality of common components 200 includes nose portion 208. Nose portion 208 may be the same as or similar to, nose portion 128. Nose portion 208 may be disposed at the foreword most point of modular aircraft 100. Nose portion 208 may include one or more sensors to detect environmental data. At least a sensor may include, torque sensor, gyroscope, accelerometer, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. For the purposes of the disclosure, a "torque datum" is one or more elements of data representing one or more parameters detailing power output by one or more propulsors, flight components, or other elements of an electric aircraft. A torque datum may indicate the torque output of at least a flight component 204. At least a flight component 204 may include any propulsor as described herein. In embodiment, at least a flight component 204 may include an electric motor, a propeller, a jet engine, a paddle wheel, a rotor, turbine, or any other mechanism configured to manipulate a fluid medium to propel an aircraft as described herein. In an embodiment of at least a sensor may include or be included in, a sensor suite. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery pack measuring temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of a battery management system and/or user to detect phenomenon is maintained and in a non-limiting example, a user alter aircraft usage pursuant to sensor readings.

With continued reference to FIG. 2, at least a sensor may include a moisture sensor. "Moisture", as used in this disclosure, is the presence of water, this may include vaporized water in air, condensation on the surfaces of objects, or concentrations of liquid water. Moisture may include humidity. "Humidity", as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity", for the purposes of this disclosure, is expressed as a percentage, indicating a present stat of absolute humidity relative to a maximum humidity given the same temperature. "Specific humidity", for the purposes of this disclosure, is the ratio of water vapor mass to total moist air parcel mass, where parcel is a given portion of a gaseous medium. A moisture sensor may be psychrometer. A moisture sensor may be a hygrometer. A moisture sensor may be configured to act as or include a humidistat. A "humidistat", for the purposes of this disclosure, is a humidity-triggered switch, often used to control another electronic device. A moisture sensor may use capacitance to measure relative humidity and include in itself, or as an external component, include a device to convert relative humidity measurements to absolute humidity measurements. "Capacitance", for the purposes of this disclosure, is the ability of a system to store an electric charge, in this case the system is a parcel of air which may be near, adjacent to, or above a battery cell.

With continued reference to FIG. 2, at least a sensor may include electrical sensors. An electrical sensor may be configured to measure voltage across a component, electrical current through a component, and resistance of a component. Electrical sensors may include separate sensors to measure each of the previously disclosed electrical characteristics such as voltmeter, ammeter, and ohmmeter, respectively. One or more sensors may be communicatively coupled to at least a pilot control, the manipulation of which, may constitute at least an aircraft command. Signals may include electrical, electromagnetic, visual, audio, radio waves, or another undisclosed signal type alone or in combination. At least a sensor communicatively connected to at least a pilot control may include a sensor disposed on, near, around or within at least pilot control. At least a sensor may include a motion sensor. "Motion sensor", for the purposes of this disclosure refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. At least a sensor may include, torque sensor, gyroscope, accelerometer, torque sensor, magnetometer, inertial measurement unit (IMU), pressure sensor, force sensor, proximity sensor, displacement sensor, vibration sensor, among others. At least a sensor 124 may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings.

With continued reference to FIG. 2, plurality of common components 200 includes control surface 212. Control surface 212 may be disposed at the trailing edge of a wing, winglet, fuselage, or other areas of modular aircraft. Control surface 212 may include any control surface as described herein such as a flap, aileron, slot, rudder, or the like. Control surface 212 may be configured to manipulate a fluid medium when mechanically actuated. Control surface 212 may be configured to alter a modular aircraft's trajectory such as changes in an aircraft's pitch, roll, yaw, and throttle as described herein.

With continued reference to FIG. 2, plurality of common components 200 includes at least an interface component 216. At least an interface component 216 may be the same or similar to at least an interface component 124 or any other interface component as described herein. At least an interface component 216 may be the imaginary mating surfaces of at least a common component when mated to adjacent components. For example, the dashed surface presented in FIG. 2 is shown as flat polygonal surfaces, but a real-world aircraft would include one or more subsystems, cavities, structures, and the like. Therefore at least an interface surface 216 may be the portion of plurality of common components 200 connected to adjacent components such as at least a modular component 108.

Figure 3:
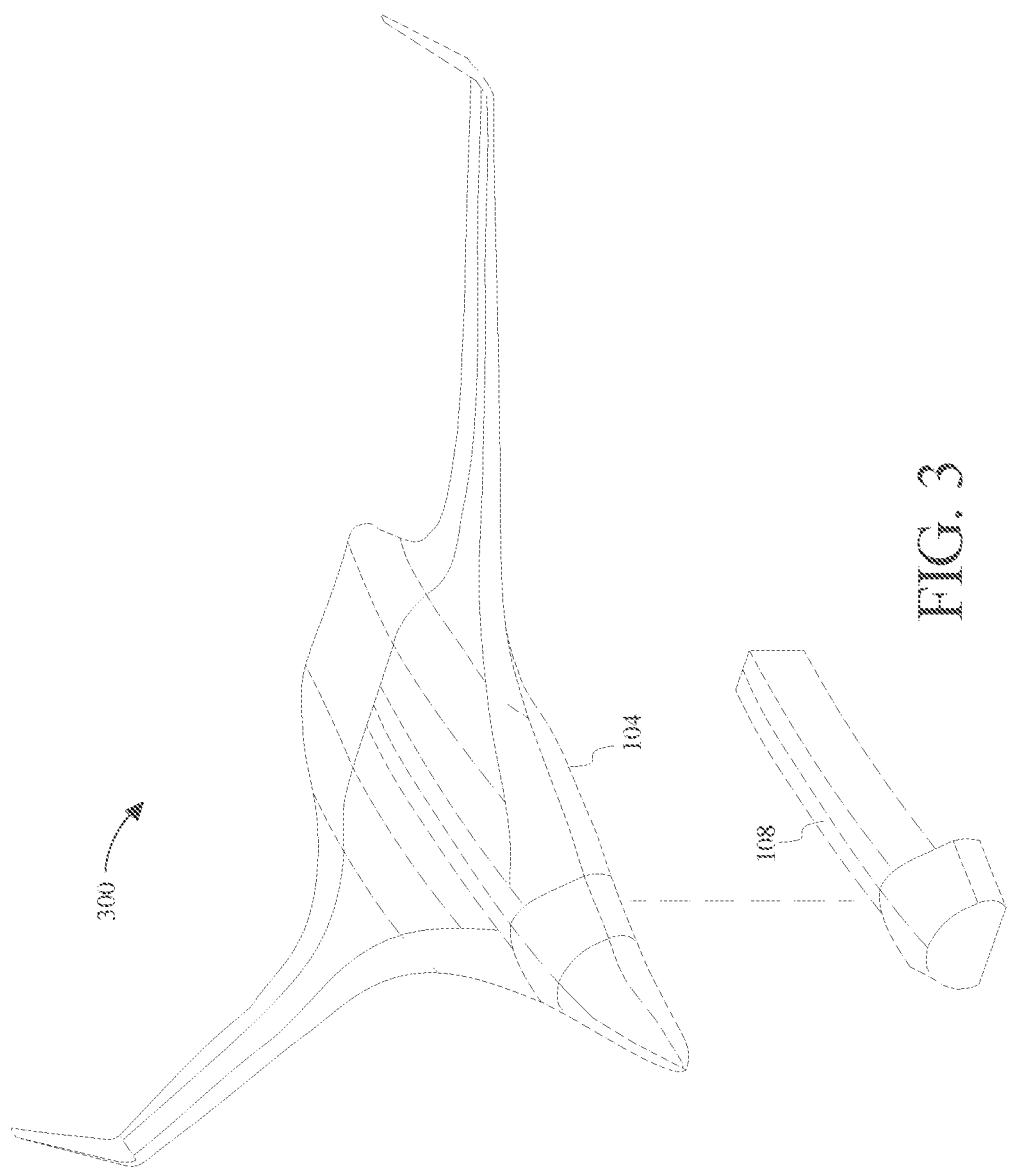
FIG. 3 is an illustration of an exemplary embodiment of a first aircraft configuration shown in isometric view.

Referring now to FIG. 3, a first aircraft configuration 300 is shown. First aircraft configuration 300 may include any of the described components herein above. For example, and without limitation, first aircraft configuration 300 may include at least a common component 104 and at least a modular component 108. First aircraft configuration 300 may include at least a common component 104 and at least a modular component 108 of a first size. In nonlimiting examples first aircraft configuration may be configured to carry passengers in airline seats. In nonlimiting examples, first aircraft configuration 300 may be configured to carry fuel tanks for aerial refuel operations. Aerial refueling, also referred to as air refueling, in-flight refueling (IFR), air-to-air refueling (AAR), and tanking, is the process of transferring aviation fuel from one military aircraft (the tanker) to another (the receiver) during flight. The two main refueling systems are probe-and-drogue, which is simpler to adapt to existing aircraft, and the flying boom, which offers faster fuel transfer, but requires a dedicated boom operator station.

Still referring to FIG. 3, the procedure allows the receiving aircraft to remain airborne longer, extending its range or loiter time. A series of air refueling can give range limited only by crew fatigue and engineering factors such as engine oil consumption. Because the receiver aircraft can be topped up with extra fuel in the air, air refueling can allow a takeoff with a greater payload which could be weapons, cargo, or personnel: the maximum takeoff weight is maintained by carrying less fuel and topping up once airborne. Aerial refueling has also been considered as a means to reduce fuel consumption on long-distance flights greater than 3,000 nautical miles (5,600 km; 3,500 mi). Potential fuel savings in the range of 35-40% have been estimated for long-haul flights (including the fuel used during the tanker missions).[2]

Still referring to FIG. 3, the aircraft providing the fuel is specially designed for the task, although refueling pods can be fitted to existing aircraft designs if the "probe-and-drogue" system is to be used. The cost of the refueling equipment on both tanker and receiver aircraft and the specialized aircraft handling of the aircraft to be refueled (very close "line astern" formation flying) has resulted in the activity only being used in military operations. In nonlimiting examples, first aircraft configuration 300 may be configured to carry cargo in the form of baggage, pallets, storage containers, or the like. A cargo aircraft (also known as freight aircraft, freighter, airlifter or cargo jet) is a fixed-wing aircraft that is designed or converted for the carriage of cargo rather than passengers. Such aircraft may not incorporate passenger amenities and generally feature one or more large doors for loading cargo. Freighters may be operated by civil passenger or cargo airlines, by private individuals or by the armed forces of individual countries.

With continued reference to FIG. 3, first configuration 300 may be designed for cargo flight may include features that distinguish them from conventional passenger aircraft: a wide/tall fuselage cross-section, a high-wing to allow the cargo area to sit near the ground, numerous wheels to allow it to land at unprepared locations, and a high-mounted tail to allow cargo to be driven directly into and off the aircraft, in nonlimiting examples. Many types can be converted from airliner to freighter by installing a main deck cargo door with its control systems; upgrading floor beams for cargo loads and replacing passenger equipment and furnishings with new linings, ceilings, lighting, floors, drains and smoke detectors.

Figure 4:
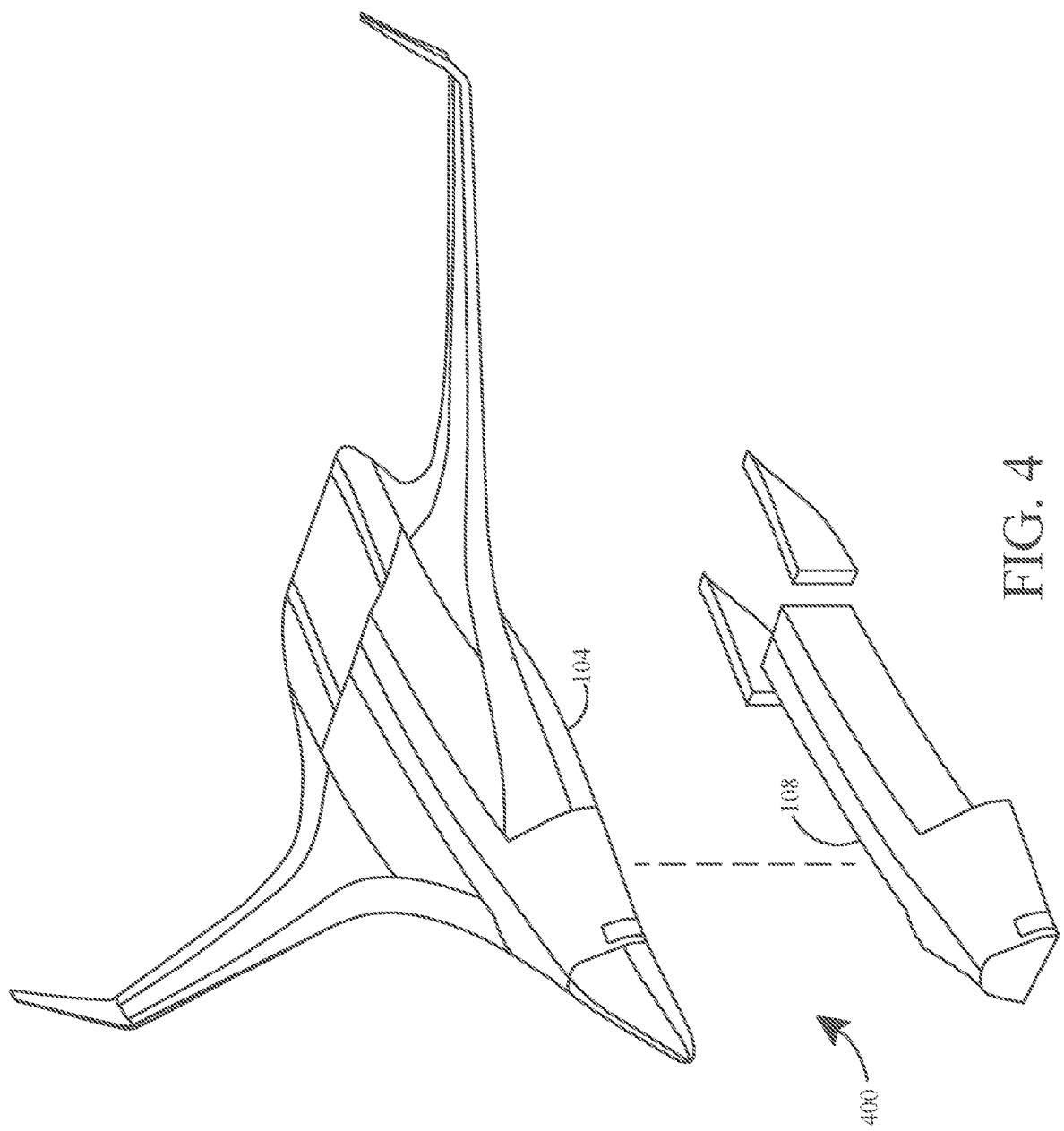
FIG. 4 is an illustration of an exemplary embodiment of a second aircraft configuration shown in isometric view.

Referring now to FIG. 4, a second aircraft configuration 400 is shown. First aircraft configuration 300 may include any of the described components herein above. For example, and without limitation, second aircraft configuration 400 may include at least a common component 104 and at least a modular component 108. Second aircraft configuration 400 may include at least a common component 104 and at least a modular component 108 of a first size. In nonlimiting examples first aircraft configuration may be configured to carry passengers in airline seats. In nonlimiting examples, second aircraft configuration 400 may be configured to carry fuel tanks for aerial refuel operations. In nonlimiting examples, second aircraft configuration 400 may be configured to carry cargo in the form of baggage, pallets, storage containers, or the like. Second aircraft configuration 400 may include one or more doors, hatches, portals, or other openings disposed on at least a modular component 108 consistent with the configuration of second aircraft configuration 400. It should be known by one of ordinary skill in the art that there are near limitless number of aircraft configurations, sizes, uses, mission sets, and this disclosure serves in no way to limit the configurations of a modular aircraft as described herein.

Figure 5:
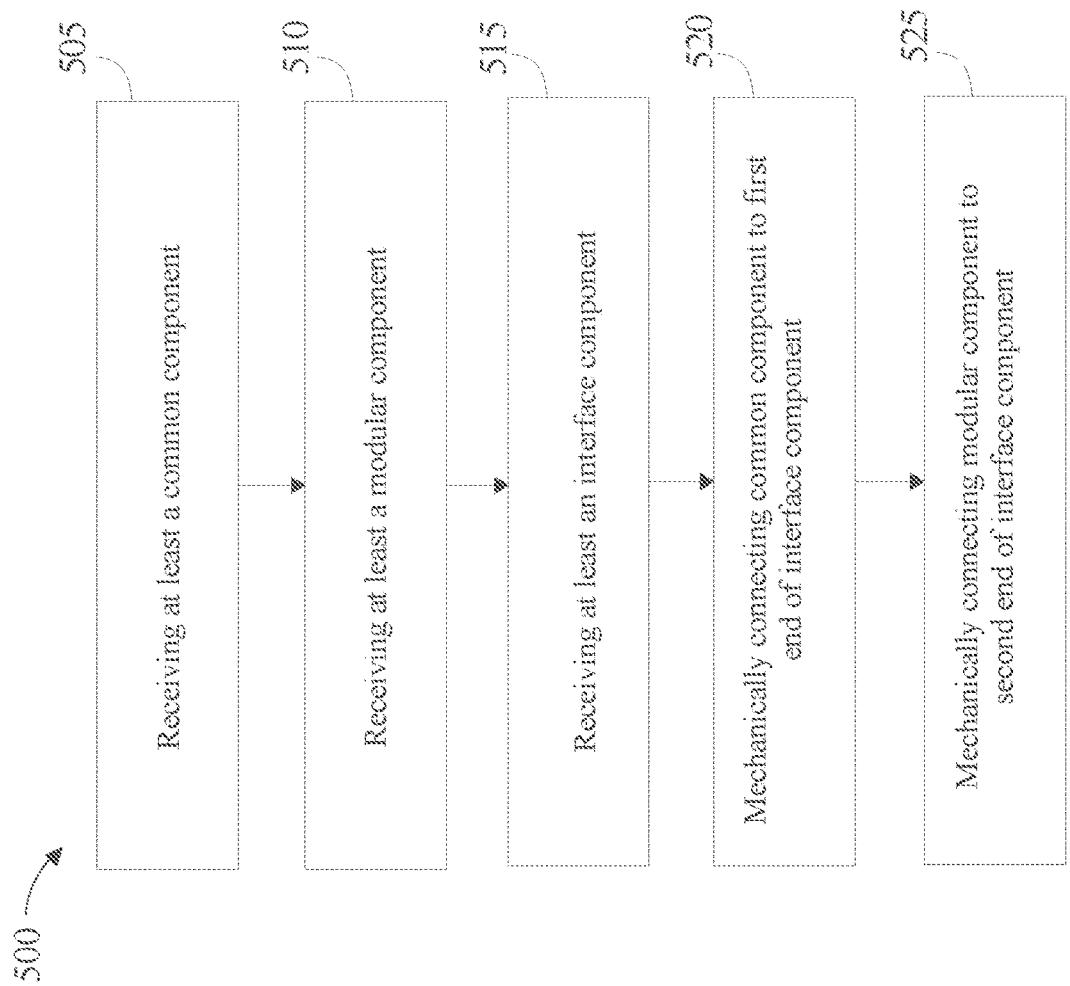
FIG. 5 is a flow diagram representing an exemplary embodiment of a method for modular aircraft.

Referring now to FIG. 5, a method for modular aircraft includes, at step 505, receiving at least a common component, wherein the at least a common component includes at least a flight component. At least a common component may be consistent with any at least a common component as described herein. At least a flight component may be consistent with any at least a flight component as described herein. The at least a common component includes at least a portion of a wing. At least a portion of a wing may be consistent with any portion of a wing as described herein. The at least a common component includes a winglet. A winglet may be consistent with any winglet as described herein. The at least a common component comprises a nose portion. A nose portion may be consistent with any nose portion as described herein. The at least a common component includes a control surface configured to manipulate a fluid medium. A control surface may be consistent with any control surface as described herein. At least a common component may include at least a nacelle. At least a nacelle may be consistent with any nacelle as described herein.

Still referring to FIG. 5, method 500 includes, at 510, receiving at least a modular component. At least a modular component may be consistent with any modular component as described herein. The at least a modular component may include a collar component configured to connect to the nose portion. A collar component may be consistent with any collar component as described herein. The at least a modular component is configured to produce a continuous outer mold line of the aircraft when connected to the at least a common component. Outer mold line may be consistent with any outer mold as described herein. The at least a modular component includes at least a structural component of the aircraft. A structural component may be consistent with any structural component as described herein. At least a modular component includes at least a fuselage component. At least a fuselage component may be consistent with any fuselage component as described herein. At least a fuselage component may include an interior cavity. An interior cavity may be consistent with any interior cavity as described herein. In some embodiments, at step 510, method 500 may additionally include receiving a first modular component, wherein the first modular component has a first width and includes a first fuselage component and a first collar component. In some embodiments, at step 510, method 500 may additionally include receiving a second modular component, wherein the second modular component has a second width and comprises a second fuselage component and a second collar component.

Still referring to FIG. 5, method 500 includes, at step 515, receiving at least an interface component. At least an interface component may include any interface component as described herein. The at least an interface component is configured to connect the at least a common component at a first end to the at least a modular component at a second end. Connection may be any mechanical connection as described herein.

Still referring to FIG. 5, method 500 includes, at step 520, connecting the at least a common component at the first end of the interface component. Method 500 includes, at step 525, connecting the at least a modular component at the second end of the interface component. In some embodiments, at step 525, method 500 may additionally include selectably connecting one of first modular component and second modular component at the second end of interface component. In some cases, connection of at least a common component, first modular component and at least an interface component forms a first blended wing body having a first wingspan that is a function of first width of the first modular component. In some cases, connection of at least a common component, second modular component and at least an interface component forms a second blended wing body having a second wingspan that is a function of second width of the second modular component.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
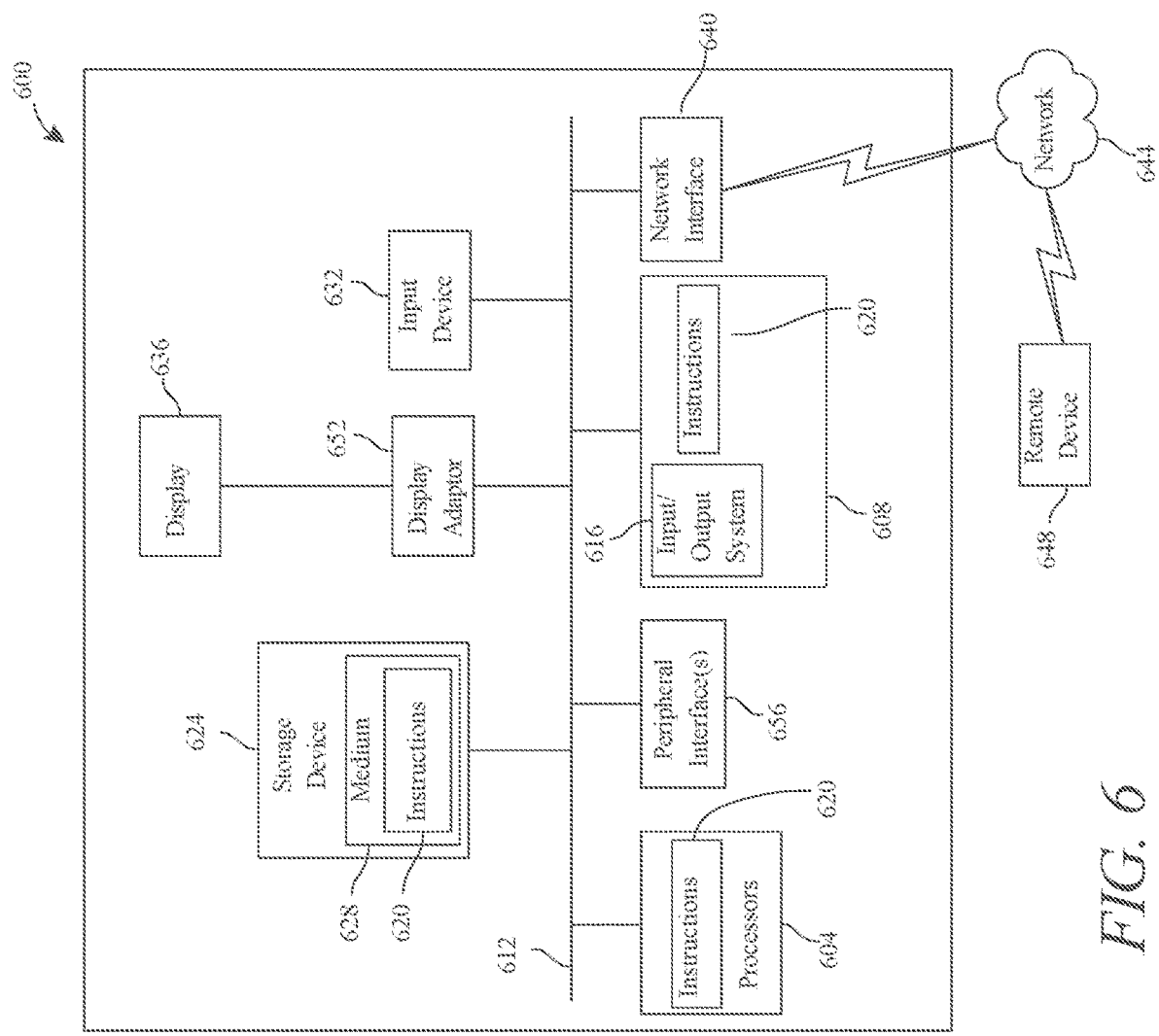
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for modular aircraft, the system comprising:
at least one common component, wherein the at least one common component comprises at least one flight component;
a nose portion which includes at least one sensor to detect environmental data;
a first modular component, wherein the first modular component has a first width and comprises:
a first fuselage component; and
a first collar component;
a second modular component, wherein the second modular component has a second width and comprises:
a second fuselage component; and
a second collar component;
at least one interface component configured to connect the at least one common component and at least one modular component, wherein the at least one interface component comprises:
a latching mechanism comprising a hook to capture at least a portion of a latching element;
a first end configured to connect to the at least one common component using the latching element, wherein the latching element is located on the first end; and
a second end configured to connect to the at least one modular component using the hook, wherein the hook is located on the second end, wherein:
connection of the at least one common component, the first modular component, and the at least one interface component forms a first blended wing body having a first wingspan that is a function of the first width; and
connection of the at least one common component, the second modular component, and the at least one interface component forms a second blended wing body having a second wingspan that is a function of the second width.

2. The system of claim 1, wherein the at least one common component comprises at least a portion of a wing.

3. The system of claim 2, wherein the at least one common component comprises a winglet.

4. The system of claim 1, wherein the at least one common component comprises a nose portion.

5. The system of claim 4, wherein one or more of the first collar component and the second collar component is configured to connect to the nose portion.

6. The system of claim 1, wherein the at least one common component comprises a control surface configured to manipulate a fluid medium.

7. The system of claim 1, wherein one or more of the first fuselage component and the second fuselage component further comprises an interior cavity.

8. The system of claim 1, wherein one or more of the first modular component and the second modular component is configured to produce a continuous outer mold line of the modular aircraft when connected to the at least one common component.

9. The system of claim 1, wherein one or more of the first modular component and the second modular component comprises at least a structural component of the aircraft.

10. The system of claim 1, wherein the latching mechanism comprises a plurality of spring loaded elements configured to:
allow the at least one modular component to move past the at least one common component in a first direction;
actuate the latching mechanism; and
latch onto the latching element to hinder movement of the at least one modular component in a second direction.

11. A method of manufacturing a modular aircraft, the method comprising:
receiving at least one common component, wherein the at least one common component comprises at least one flight component and a nose portion which includes at least one sensor to detect environmental data;
receiving a first modular component, wherein the first modular component has a first width and comprises:
a first fuselage component; and
a first collar component;
receiving a second modular component, wherein the second modular component has a second width and comprises:
a second fuselage component; and
a second collar component;
receiving at least one interface component configured to connect the at least one common component and at least one modular component, the at least one interface component comprising:
a latching mechanism comprising a hook to capture at least a portion of a latching element;
a first end configured to connect to the at least one common component using the latching element, wherein the latching element is located on the first end; and
a second end configured to connect to the at least one modular component using the hook, wherein the hook is located on the second end;
connecting the at least one common component at the first end of the at least one interface component; and
selectably connecting one of the first modular component and the second modular component at the second end of the at least one interface component, wherein:
connection of the at least one common component, the first modular component, and the at least one interface component forms a first blended wing body having a first wingspan that is a function of the first width; and
connection of the at least one common component, the second modular component, and the at least one interface component forms a second blended wing body having a second wingspan that is a function of the second width.

12. The method of claim 11, wherein the at least one common component comprises at least a portion of a wing.

13. The method of claim 12, wherein the at least one common component comprises a winglet.

14. The method of claim 11, wherein the at least one common component comprises a nose portion.

15. The method of claim 14, further comprising selectably connecting one of the first collar component and the second collar component with the nose portion.

16. The method of claim 11, wherein the at least one common component comprises a control surface configured to manipulate a fluid medium.

17. The method of claim 11, wherein one or more of the first fuselage component and the second fuselage component further comprises an interior cavity.

18. The method of claim 11, wherein one or more of the first modular component and the second modular component is configured to produce a continuous outer mold line of the modular aircraft when connected to the at least one common component.

19. The method of claim 11, wherein one or more of the first modular component and the second modular component comprises at least a structural component of the aircraft.

* * * * *